US012065628B2

(12) United States Patent
Purdy et al.

(10) Patent No.: US 12,065,628 B2
(45) Date of Patent: Aug. 20, 2024

(54) STABLE NITRIC ACID BLENDS AND USES THEREOF

(71) Applicant: Fluid Energy Group Ltd., Calgary (CA)

(72) Inventors: Clay Purdy, Medicine Hat (CA); Markus Weissenberger, Calgary (CA); Kyle G. Wynnyk, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 180 days.

(21) Appl. No.: 17/338,361

(22) Filed: Jun. 3, 2021

(65) Prior Publication Data

US 2021/0380906 A1 Dec. 9, 2021

(30) Foreign Application Priority Data

Jun. 5, 2020 (CA) ...................................... 3081989

(51) Int. Cl.

| | |
|---|---|
| ***C11D 3/02*** | (2006.01) |
| ***C11D 1/00*** | (2006.01) |
| ***C11D 3/04*** | (2006.01) |
| ***C11D 3/26*** | (2006.01) |
| ***C11D 3/34*** | (2006.01) |
| ***C11D 3/39*** | (2006.01) |
| ***C11D 3/395*** | (2006.01) |
| ***C11D 11/00*** | (2006.01) |

(52) U.S. Cl.

CPC .............. *C11D 3/042* (2013.01); *C11D 1/002* (2013.01); *C11D 3/26* (2013.01); *C11D 3/3902* (2013.01); *C11D 3/3937* (2013.01); *C11D 3/3947* (2013.01); *C11D 11/0041* (2013.01)

(58) Field of Classification Search

CPC ........... C11D 3/26; C11D 3/042; C11D 3/349; C11D 3/3902; C11D 3/3947

USPC ....... 510/171, 218, 202, 247, 264, 269, 496, 510/499

See application file for complete search history.

(56) References Cited

U.S. PATENT DOCUMENTS

| | | | | |
|---|---|---|---|---|
| 3,652,420 A * | 3/1972 | Hill | A61K 8/042 | 510/400 |
| 4,108,680 A | 8/1978 | Barr, Jr. | | |
| 4,264,463 A | 4/1981 | Kotake et al. | | |
| 4,587,264 A | 5/1986 | Jourdan-Laforte et al. | | |
| 5,496,959 A * | 3/1996 | Day | C07C 303/32 | 554/49 |
| 2009/0062175 A1* | 3/2009 | Cermenati | C11D 7/06 | 510/407 |
| 2009/0197786 A1* | 8/2009 | Perry | C11D 3/225 | 510/191 |
| 2009/0324964 A1* | 12/2009 | Jaynes | C11D 3/3796 | 510/475 |
| 2012/0070388 A1* | 3/2012 | Man | D06L 1/12 | 508/501 |
| 2013/0196890 A1* | 8/2013 | Post | C11D 3/042 | 510/109 |
| 2018/0249704 A1* | 9/2018 | Man | A01N 25/02 | |

FOREIGN PATENT DOCUMENTS

| | | | |
|---|---|---|---|
| FR | 2462425 A1 | 2/1981 | |
| KR | 100249061 B1 | 4/2000 | |
| WO | WO-2006021322 A1 * | 3/2006 | C11D 3/378 |
| WO | WO-2006131689 A1 * | 12/2006 | C11D 1/02 |

* cited by examiner

*Primary Examiner* — Gregory R Delcotto

(74) *Attorney, Agent, or Firm* — Berg Hill Greenleaf Ruscitti LLP

(57) ABSTRACT

A modified aqueous acid composition comprising: nitric acid; sulfuric acid; a compound comprising an amine moiety and a sulfonic acid moiety; and a peroxide. Also disclosed are methods of using such composition.

16 Claims, No Drawings

STABLE NITRIC ACID BLENDS AND USES THEREOF

CROSS REFERENCE TO RELATED APPLICATIONS

This application claims the benefit of and priority to Canadian Patent Application No. 3,081,989, filed Jun. 5, 2020. The entire specification and figures of the above-referenced application are hereby incorporated, in their entirety by reference.

FIELD OF THE INVENTION

The present invention relates to a novel nitric acid containing composition, more specifically a nitric acid composition comprising sulfuric acid and its uses in cleaning/disinfecting/sanitizing various equipment and surfaces.

BACKGROUND OF THE INVENTION

Food processing and preparation in industry is practically done in all cases on stainless steel surfaces as it is virtually inert when exposed to food and food products. Stainless steel is prevalent in the food industry, countertops, tools and the like are all exposed to various food elements, carcasses and the like which may be a source of bacterial contamination. It is imperative that the surfaces be treated in order to stem cross-contamination or spread of bacteria or the like. *Listeria* is a bacterium which is commonly heard in the news as the contaminant in several outbreaks in slaughterhouses or food processing plants. Typically, it is found in dairy and the resulting disease, listeriosis, is an infection caused by eating food contaminated with the bacteria. Listeriosis can cause serious illness in pregnant women, newborns, adults with weakened immune systems and the elderly, and may cause gastroenteritis in others who have been severely infected. Listeriosis is fatal in approximately 20% of all cases contracting it.

Accordingly, disinfecting and sterilizing agents authorized in the food industry need to be effective to kill all types of bacteria, such as *listeria*, all the while cause no corrosion to the stainless-steel surfaces. Hydrochloric acid is one example of a chemical which is highly corrosive to stainless steel.

The dairy industry is one which is prone to substantial issues of scaling inside the equipment used as the protein in the milk can tend to deposit on inner surfaces and form the base of a scale patch. This is true especially given the fact that often times the milk is heated to treat it and can subsequently leave a film inside the pipes. The milky film consisting of organic matter such as fat, protein, and inorganic salts promotes the growth of microbes. The cleaning of the equipment used in the dairy industry is critical in order to avoid widespread microbial contamination which, if left undetected, could lead to the various ailments and possibly the death of consumers.

Scales adhered on an inner wall of an apparatus used in various food preparation processes are made of difficult to dissolve calcium oxalate but which may also contain other organic scales and/or residues such as fats, proteins and polysaccharides. Scale containing calcium oxalate as a main component are not desirable as they can easily corrode most metals including stainless steel.

These scales are not easily dissolved by the conventional methods, since the scale containing calcium oxalate as a main component (hereinafter referred to as a scale of calcium oxalate) is a very difficult scale to remove under either acidic or basic conditions.

Such scales can be found on the inner wall of an evaporator for concentrating a waste solution discharged from a digester (black liquor) in a sulfite pulp process, a chemi-ground pulp process or a semichemical pulp process. It can also be found on the following surfaces: the inner wall of an apparatus for producing a cane sugar or a beet sugar; the inner wall of an apparatus for producing beer, whisky or wine; the inner wall of an apparatus for producing or processing dairy products; and the inner wall of a bleaching tower for bleaching a pulp.

Conventionally, removing the scale by a mechanical approach such as through the use of a high pressure water at 200 to 350 bar. Can efficiently remove scale by breaking it off or peeling it off the surface such as conduits and tanks. However, such as approach is capital intensive as there exist the need to have, on hand, a high pressure cleaning device as well as pressure resistant devices. Such an approach also requires manpower and the equipment requires a substantial amount of energy to operate. Moreover, such a mechanical approach is never 100% guaranteed to remove contaminant scale in curved surfaces or corners.

U.S. Pat. No. 4,264,463 discloses a scale containing calcium oxalate as a main component which is adhered on an inner wall of an apparatus is easily removed by contacting it with an aqueous solution containing (1) aluminum ions and/or ferric ions and (2) anions of acid.

When a scale is adhered on an inner wall of an evaporator, a heat conductivity is reduced whereby it is important to remove the scale. Moreover, the presence of scale inside the walls of an evaporator can be the source of unwanted microbial growth. Generally, commercial solutions of peracetic acid are diluted before use with water to bring the concentration of peracetic acid to between 30 and 300 mg/liter. Compositions of peracetic acid, diluted with deionized water do not tend to corrode the type of stainless steel in food processing, but the use of deionized water makes it too expensive to apply such a cleaning approach to a whole industry. On the other hand, the use of tap water which may have traces of dissolved chlorides, pitting corrosion can occur on certain types of stainless steel. The presence of chlorides is the corrosion may lead to premature equipment breakdown and should be avoided as much as possible.

U.S. Pat. No. 4,108,680 discloses a mixture of nitric acid and manganese dioxide said to be effective in removing calcium oxalate scale from metal surfaces.

KR patent no. 100249061B1 discloses a composition having a high stability in the case of the inorganic peroxide are particularly used in industrial applications. Namely, it is stated that the stabilized composition of the inorganic peroxides are used in bath surface treatment of metal components, the composition is said to include one of: benzotriazole, imidazole, and carboxyl imidazole.

Solutions of carboxylic peracids are generally obtained by the chemical reaction of hydrogen peroxide with a corresponding carboxylic acid.

French patent no. 2,462,425, discloses a process especially applicable to the preparation of stable dilute solutions of peracetic acid in which, in a first stage, a concentrated solution of aliphatic carboxylic peracid is prepared from the acid or the corresponding anhydride and concentrated hydrogen peroxide, in the presence of the minimum amount of a strong acid catalyst necessary to obtain balance of the system in a maximum period of 48 hours; and, in a second stage the concentrated solution of aliphatic peracid is diluted with a solution that contains at least a reactive constituent to bring the concentration of aliphatic peracid to the nominal concentration of the mixture.

Dilute solutions of peracids obtained from such process are generally regarded favorably as they are easier to transport and handle than concentrated solutions, due to the reactive nature of the peracid, and other factors related to the handling thereof (odor, dermal irritation, and eyes, skin, and respiratory tract sensitivity to such).

U.S. Pat. No. 4,587,264 discloses compositions containing nitric acid, acetic acid, hydrogen peroxide, peracetic acid, water and a phosphonic acid component for use in disinfecting stainless steel equipment using peracetic acid without nitric acid or the like. The patent states that nitric acid leads to very valued results, by making it possible mainly to eliminate the problem of cavernous corrosion observed especially curing the disinfecting of the equipment of the food industry made with the current grades of stainless steel, and when the commercial solutions of carboxylic peracetic acid, are diluted with ordinary water. Moreover, nitric acid incorporated in the commercial solution of peracetic acid is an inexpensive anticorrosive agent, authorized for food disinfecting and which does not adversely affect the stability of the peracetic acid. The patent goes on to state that the diluted commercial solutions containing between 1 and 20%, preferably 2 to 5% by weight of carboxylic peracid, contain an amount of nitric acid such that the concentration of nitric acid will be preferably between 6 and 15% by weight. It is further stated that, solutions of 2% by weight of peracetic acid and 8% by weight of nitric acid, diluted with water to provide 50 mg of peracetic acid per liter, do not cause cavernous corrosion of type 18-10 stainless steel.

In light of the existing prior art, there still exists a need for a composition for use in the removal of calcium oxalate scale which maintains its stability over a long period of time.

SUMMARY OF THE INVENTION

It has been found that the incorporation of a compound comprising an amine group as well as a sulfonic acid functional group provide a never before seen stability to peroxide components in compositions used for cleaning/disinfection/sanitizing of surfaces where microbial growth is present. Compositions according to the present invention are free of phosphonic acids.

According to an aspect of the present invention, there is provided a novel modified aqueous acid composition comprising:

nitric acid;

sulfuric acid;

a compound comprising an amine moiety and a sulfonic acid moiety; and a peroxide.

Preferably, the peroxide and said compound comprising an amine moiety and a sulfonic acid moiety are present in a molar ratio of no more than 5:1.

According to an object of present invention, there is provided a modified aqueous acid composition comprising:

nitric acid;

sulfuric acid;

a compound comprising an amine moiety and a sulfonic acid moiety; and a peroxide;

wherein sulfuric acid and said compound comprising an amine moiety and a sulfonic acid moiety are present in a molar ratio of no less than 1:3. Preferably, said compound comprising an amine moiety and a sulfonic acid moiety is selected from the group consisting of: taurine; taurine derivatives; and taurine-related compounds. More preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates. Most preferably, said compound comprising an amine moiety and a sulfonic acid moiety is taurine.

Preferably, the source of peroxide is selected from the group consisting of: hydrogen peroxide; benzoyl peroxide; percarbonates; perborates; persulfates; and combinations thereof.

According to an object of present invention, there is provided an aqueous composition for use in the removal of calcium oxalate scale, wherein said composition comprises:

nitric acid in an amount ranging from 2 to 10 wt % of the total weight of the composition;

sulfuric acid in an amount ranging from 2 to 10 wt % of the total weight of the composition;

a compound comprising an amine moiety and a sulfonic acid moiety selected from the group consisting of: taurine; taurine derivatives; and taurine-related compounds in an amount ranging from 0.2 to 20 wt % of the total weight of the composition; and a peroxide in an amount ranging from 0.5 to 20 wt % of the total weight of the composition.

According to an object of present invention, there is provided a composition for use in the removal of calcium oxalate scale, wherein said composition comprises:

nitric acid;

sulfuric acid;

a compound comprising an amine moiety and a sulfonic acid moiety selected from the group consisting of: taurine and derivatives thereof such as taurine-related compounds; and peroxide;

wherein the total molar ratio of peroxide to nitric acid, sulfuric acid and sulfonic acid moiety ranges from 1:5 to 5:1.

According to a preferred embodiment of the present invention, there is total molar ratio of peroxide to nitric acid, sulfuric acid and sulfonic acid moiety ranges from 1:3 to 3:1.

According to another preferred embodiment of the present invention, the total molar ratio of peroxide to nitric acid, sulfuric acid and sulfonic acid moiety ranges from 1:1 to 2:1.

Preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates. Most preferably, said compound comprising an amine moiety and a sulfonic acid moiety is taurine.

According to a preferred embodiment of the present invention, the source of peroxide is selected from the group consisting of: hydrogen peroxide; benzoyl peroxide; percarbonates; perborates; persulfates; and combinations thereof. Preferably, the source of peroxide is hydrogen peroxide.

According to a preferred embodiment of the present invention, there is provided a peroxide-containing composition having a pH of at least 1 and a peroxide content of at least 75% after 45 days, said composition comprising: nitric acid; sulfuric acid; a compound comprising an amine moiety and a sulfonic acid moiety selected from the group consisting of: taurine and derivatives thereof such as taurine-related compounds; a source of peroxide; and water.

According to another preferred embodiment of the present invention, there is provided a peroxide-containing composition having a pH of at least 1 and a peroxide content of at least 95% after 14 days, said composition comprising: nitric acid; sulfuric acid; a compound comprising an amine moiety and a sulfonic acid moiety selected from the group consisting of: taurine and derivatives thereof such as taurine-related compounds; a source of peroxide; and water.

According to yet another preferred embodiment of the present invention, there is provided a peroxide-containing composition having a pH of at least 1 and a peroxide content of at least 90% of the initial peroxide concentration after 20 days, said composition comprising: nitric acid; sulfuric acid; a compound comprising an amine moiety and a sulfonic acid moiety selected from the group consisting of: taurine and derivatives thereof such as taurine-related compounds; a source of peroxide; and water.

According to an object of present invention, there is provided a method of removing calcium oxalate scale from a surface contaminated therewith, said method comprising: providing a surface contaminated with calcium oxalate scale;

exposing said surface contaminated with calcium oxalate scale to a composition comprising:

nitric acid;

sulfuric acid;

a compound comprising an amine moiety and a sulfonic acid moiety selected from the group consisting of: taurine; taurine derivatives; and taurine-related compounds; and a peroxide;

for a period of time sufficient to remove a pre-determined amount of said scale.

Preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

According to a preferred embodiment of the present invention, the composition exhibits advantageous stability with respect to peroxide content over a period of at least 7 days, when compared to similar compositions which lack a compound comprising an amine moiety and a sulfonic acid moiety. Preferably, said composition exhibits a peroxide content of at least 90% after 20 days at room temperature and ambient pressure. More preferably, said composition exhibits a peroxide content of at least 95% after 14 days at room temperature and ambient pressure. Even more preferably, said composition exhibits a peroxide content of at least 75% after 45 days at room temperature and ambient pressure.

Preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates. Preferably, taurine is used in the composition.

Taurates are used as mild, well-foaming surfactants in body cleansing and personal care products; textile processing such as wetting agents; detergents; and dye dispersants; and, in crop protection formulations as well as other industrial uses.

According to a preferred embodiment of the present invention, the peroxide is hydrogen peroxide.

It is an object of the present invention to provide a composition for removing a scale of calcium oxalate which is formed on a surface selected from the group consisting of: an inner wall of an apparatus used in a sulfite pulp process, a chemiground pulp process, semichemical pulp process, a cane sugar or beet sugar manufacturing process, a beer fermentation process, a wine fermentation process or a whisky distillation process or a pulp bleaching process.

The foregoing and other objects of the present invention have been attained by contacting a scale of calcium oxalate with an aqueous composition comprising: nitric acid; sulfuric acid; a peroxide source; and a compound comprising an amine moiety and a sulfonic acid moiety. Preferably, the compound comprising an amine moiety and a sulfonic acid moiety is selected from the group consisting of: taurine; taurine derivatives; and taurine-related compounds. More preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates. Most preferably, the compound comprising an amine moiety and a sulfonic acid moiety is taurine.

Preferably, the source of peroxide is selected from the group consisting of: hydrogen peroxide; benzoyl peroxide; percarbonates; perborates; persulfates; and combinations thereof. Preferably, the source of peroxide is hydrogen peroxide. Preferably, any cheap source of peroxide should be considered.

Preferably, the composition has a pH of less than 1. More preferably, the composition has a pH of less than 0.5.

DETAILED DESCRIPTION OF THE PREFERRED EMBODIMENTS

It will be appreciated that numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

According to a preferred embodiment of the present invention, the composition is a multi-purpose aqueous acid hard surface cleaner, sanitizer, and/or disinfectant. Preferably, the compositions according to the present invention have value in the dissolution of calcium oxalate scale. According to a preferred embodiment, the composition may be applied by pouring a pre-determined amount onto a surface and subsequently, after a pre-determined period of time, removing such with a thorough rinse, or with a cloth or the like.

In the method for removing calcium oxalate scale, it is desirable to avoid the formation of a precipitate during/after treatment in the surrounding solution. In order to do so, one can typically prevent by using an aqueous solution containing anions of acid which do not form a precipitate. For example, acidic anions which can readily form a precipitate include but are not limited to sulfate ions and phosphate ions which form calcium sulfate and calcium phosphate.

According to a preferred embodiment of the present invention, the method for calcium oxalate scale removal is applied to:

scale adhered on an inner wall of an evaporator for concentrating a black liquor of a waste solution discharged from a digester in a sulfite pulp process, a chemiground pulp process or a semichemical pulp process;

scale adhered on inner walls of apparatuses contacting with a squeezed or extracted sugar syrup, a clarified sugar syrup or a concentrated sugar syrup in steps of producing a crude molasses from the squeezed or extracted syrup in sugar industry; and scale adhered on an inner wall of an apparatus contacting molasses in a step of producing refined molasses from the crude molasses.

According to another preferred embodiment of the present invention, the method for calcium oxalate scale removal is applied to scale adhered on an inner wall of a beer fermentation vessel.

According to another preferred embodiment of the present invention, the method for calcium oxalate scale removal is applied to scale adhered on an inner wall of a fermentation vessel to prepare whisky or a distiller for a distillation of a fermented culture.

According to another preferred embodiment of the present invention, the method for calcium oxalate scale removal is applied to scale adhered on an inner wall of a fermentation vessel for a fermentation of a grape juice to prepare wine.

According to another preferred embodiment of the present invention, the method for calcium oxalate scale removal is applied to a surface selected from the group consisting of: scale adhered on an inner wall of a bleaching tower for bleaching a pulp, especially a kraft pulp in a multi-bleaching steps, such as five steps of a chlorination step, an alkali extraction step, a hypochlorite bleaching step, chlorine dioxide bleaching step and a peroxide bleaching step, especially in the hypochlorite bleaching step.

The efficiency for removing a scale of calcium oxalate is mainly depending upon a velocity for dissolving difficult-to-dissolve calcium oxalate but which may also contain other organic scales and/or residues such as fats, proteins and polysaccharides, regardless of a solubility of calcium oxalate itself.

Preferably, the composition used should not contain a material causing an environmental pollution and a precipitate in the solution by contacting with a scale of calcium oxalate and which does not corrode an inner wall of an apparatus used in food processing.

High temperatures are typically preferred when trying to remove scale from surface as the components of a composition are more reactive under such conditions. However, the temperature must also be balanced with the potential damage which can occur when exposing metal surfaces to cleaning compositions, especially if such contain acid or the like. Accordingly, it is preferably to maintain the temperature of the treatment (hence the temperature of the composition) between 20° C. to 90° C. and more preferably between 30° to 70° C., even more preferably, between 50° C. to 70° C.

In the present description, effective amounts are generally those amounts listed as the ranges or levels of ingredients in the descriptions which follow hereto. Unless otherwise stated, amounts listed in percentage ("%'s") are in weight percent of the composition.

Water

According to a preferred embodiment of the present invention, the composition is mainly comprised of water with relatively low levels of active ingredients such as acid and peroxide.

According to a preferred embodiment deionized water is used. According to another preferred embodiment tap water is used. Preferably, the type of water can be selected from the group consisting of: reverse osmosis; deionized; distilled and tap water.

According to a preferred embodiment of the present invention, the composition advantageously further comprises at least one surface active agent. Preferably, the surface active agent is a surfactant. Preferably, the surfactant can be selected from the group consisting of: anionic; cationic; non-ionic; and amphoteric surfactants.

According to a preferred embodiment of the present invention, a small amount of additives can be incorporated for improving the cleaning performance or aesthetic qualities of the cleaner. Adjuncts for cleaning include additional surfactants, such as those described in Kirk-Othmer, Encyclopedia of Chemical Technology 3rd Ed., Volume 22, pp. 332-432 (Marcel-Dekker, 1983), which are incorporated herein by reference. Aesthetic adjuncts include fragrances, such as those available from Givaudan, IFF, Quest and others, and dyes and pigments which can be solubilized or suspended in the formulation, such as diaminoanthraquinones. The amount of these cleaning and aesthetic additives should remain low and should preferably not consist of more than 1% by weight of the total weight of the composition.

Example 1

According to a preferred embodiment of the present invention, a composition was prepared by admixing water, nitric acid, sulfuric acid, taurine and hydrogen peroxide to yield a concentration of each component as seen in Table 1. A conventional composition was similarly prepared

TABLE 1

Components in a conventional nitric acid composition vs a preferred embodiment of the present invention

| Component | Conventional composition | Example #1 - Preferred embodiment composition |
|---|---|---|
| $H_2O$ | 82 wt % | 77 wt % |
| $HNO_3$ | 8 wt % | 7.5 wt % |
| $H_2SO_4$ | 2 wt % | 1.8 wt % |
| $H_2O_2$ | 8 wt % | 7.5 wt % |
| Taurine | none | 6.2 wt % |

The pH of both compositions was measured and determined to be −0.04 and −0.06, for the conventional and preferred embodiment respectively.

Titration of a conventional nitric acid-$H_2SO_4$ and peroxide blend and a preferred composition of the present invention A titration of a conventional nitric acid-$H_2SO_4$ and peroxide blend and a preferred composition of the present invention was carried out to assess the respective stability of each composition. The compositions are stored capped, but not sealed in a water bath at a constant temperature of 30° C.

To determine the concentration of $H_2O_2$ the solutions were titrated against a standardized $KMnO_4$ solution. The titration procedure follows:

A solution with approximately 195 mL of $dH_2O$ and 5 mL of 96% $H_2SO_4$ was prepared Approximately 0.1000 g of the composition was measured by an analytical balance and recorded The diluted $H_2SO_4$ solution was used to quantitatively transfer the measured composition into a 250 mL Erlenmeyer flask The solution was mixed constantly with a magnetic stir plate/stir bar during the titration The solution was titrated using the standardized $KMnO_4$ solution until the appearance of a persistent clear-pink for at least 1 minute.

The stability of the compositions was measured in terms of $H_2O_2$ percent yield and is summarized over a period of up to 45 days below in Table 2.

The moles of $H_2O_2$ found in the titrated sample and the moles of $H_2O_2$ used in the synthesis are used to calculate the percent yield.

TABLE 2

Titration results of a conventional nitric acid-$H_2SO_4$ and peroxide blend and a preferred composition of the present invention

| Day | Conventional Composition (% yield) | Preferred embodiment composition |
|---|---|---|
| 0 | 103.2 | 105.0 |
| 7 | 84.6 | 98.6 |
| 14 | 74.9 | 95.3 |
| 20 | 69.3 | 92.1 |
| 28 | 61.3 | 89.0 |
| 45 | 45.7 | 79.0 |

In terms of stability, the composition according to a preferred embodiment of the present invention has shown significant superiority when compared to the conventional composition at each time interval where a measurement was taken.

Corrosion Testing

Corrosion testing was carried out using a conventional nitric acid-$H_2SO_4$ and peroxide blend and a preferred composition of the present invention. This was performed to assess the corrosiveness of both compositions.

Procedure:

The metal coupon was washed with acetone, air dried, and weighed, before being suspended in the test fluid. Each cell was placed in a preheated water bath for the specified test duration. After the exposure period, the coupon was removed, washed with water, followed by an acetone wash, air dried, and then weighed. The corrosion rate was determined from the weight loss, and the pitting index was evaluated visually at 40× magnification, and a photo of the coupon surface at 40× magnification was taken.

Results:

The corrosion test results are shown in Table 3. It was found that both the conventional composition (containing nitric acid-sulfuric acid-peroxide) and a preferred composition according to the present invention were not compatible with 1018CS or A7075 type metals. Test A indicates the composition which does not contain taurine while Test B indicates the composition which does contain taurine.

TABLE 3

Results of corrosion testing carried out on 316SS coupons at 55° C. for a period of 7 days at ambient pressure

| Test | Coupon | Temperature ° C. | Temperature ° F. | Duration (days) | Corrosion Rate (mm/year) | Pitting Index |
|---|---|---|---|---|---|---|
| A | V354 | 55 | 131 | 7 | 0.004 | 0 |
| B | V391 | 55 | 131 | 7 | 0.000 | 0 |

Scale Dissolution Testing—Fresh Compositions

Testing was carried out using a conventional nitric acid-$H_2SO_4$ and peroxide blend and a preferred composition of the present invention to assess the potency of each on the dissolution of calcium oxalate scale. Calcium oxalate scale is frequently comprised of several calcium salts such as calcium carbonate, calcium sulfite and/or other calcium salts. Since calcium oxalate is the most difficult to dissolve and frequently comprises the largest portion of the scale, the dissolution testing below was designed to solely focus on the ability of compositions to dissolve calcium oxalate.

To determine the solubility of $CaO_2H_4.H_2O$ approximately 2 g of $CaO_2H_4.H_2O$ was added to 50 mL of OXR, where the mass of $CaO_2H_4.H_2O$ was measured by difference. The $CaO_2H_4.H_2O$—OXR mixture was stirred at 200 rpm for 4 hrs at ambient conditions. The mixture was then filtered under vacuum and dried at approximately 40° C. overnight. The filtered $CaO_2H_4.H_2O$ was cooled to room temperature and the filtered $CaO_2H_4.H_2O$ mass was measured by difference.

The solubility of $CaO_2H_4.H_2O$ in a conventional composition of nitric acid/sulfuric acid/peroxide was then calculated and determined to be 12.7 kg/m3 at ambient conditions.

The solubility of $CaO_2H_4.H_2O$ in a composition according to a preferred embodiment of the present invention was then calculated and determined to be 13.4 kg/m3 at ambient conditions.

The testing was carried out using a freshly prepared solution of the conventional composition as well as a freshly prepared solution of the composition according to a preferred embodiment of the present invention.

Further dissolution testing was carried out using aged compositions of both tested composition. The results are set out below.

Scale Dissolution Testing—Aged compositions

Additional dissolution testing was carried out using an aged solution of the conventional nitric acid-$H_2SO_4$ composition and peroxide blend and an aged solution of the preferred composition of the present invention to assess the effect of peroxide degradation on the potency of each on the dissolution of calcium oxalate scale.

Preferred compositions of the present invention provide a higher stability than the known composition, are free of phosphonic acid (and derivatives) and are capable of tempering the reaction between the composition and organic components found in the scale being treated/removed in order to prevent the formation of carbon black (or carbon black residue). Carbon black does not dissolve in water and if such were to be formed on the surface of a scale being treated it would prevent any chemical reaction from occurring and would thus force an operator to use mechanical means to remove the carbon black-coated scale. Carbon black is formed when organic matter is exposed to a strong acid which decomposes it down to carbon atoms. The compositions according to a preferred embodiment of the present prevent the degradation of organic matter down to carbon atoms as it slows down the reaction between the acids and said organic matter.

5-Component Compositions

The inventors further tested combinations of monoethanolamine and methane sulfonic acid in acidic compositions comprising: nitric acid; sulfuric acid and peroxide.

The blends were stable with no color change and no peroxide degradation over a 24 hr period. According to a preferred embodiment of the present invention, one could substitute a compound comprising an amine moiety and a sulfonic acid moiety with a compound comprising an amine moiety and a compound comprising a sulfonic acid moiety. Preferably, the compound comprising an amine moiety is an alkanolamine, and more preferably the alkanolamine is selected from the group consisting of: monoethanolamine and diethanolamine. Preferably, said compound comprising a sulfonic acid moiety is an alkanesulfonic acid, more preferably, the alkanesulfonic acid is selected from the group consisting of: methane sulfonic acid; ethane sulfonic acid and combinations thereof.

In light of the above, according to another aspect of the present invention, there is provided a modified aqueous acid composition comprising:

nitric acid;

sulfuric acid;

a compound comprising an amine moiety;

a compound comprising sulfonic acid moiety; and a peroxide.

Preferably, the peroxide and said compound comprising an amine moiety are present in a molar ratio of no more than 15:1, more preferably, no more than 10:1, even more preferably, no more than 9:1.

According to another aspect of the present invention, there is provided a modified aqueous acid composition comprising:

nitric acid;

sulfuric acid;

a compound comprising an amine moiety;

a compound comprising sulfonic acid moiety; and a peroxide;

wherein sulfuric acid and said compound comprising sulfonic acid moiety are present in a molar ratio of no less than 1:3.

Preferably, said compound comprising an amine moiety is selected from the group consisting of: monoethanolamine; diethanolamine; and triethanolamine.

Preferably, said compound comprising an sulfonic acid moiety is selected from the group consisting of: methanesulfonic acid; and ethanesulfonic acid.

According to a preferred embodiment of the present invention, said compound comprising an amine moiety is monoethanolamine.

According to a preferred embodiment of the present invention, said compound comprising an sulfonic acid moiety is methanesulfonic acid.

According to a preferred embodiment of the present invention, the source of peroxide is selected from the group consisting of: hydrogen peroxide; benzoyl peroxide; percarbonates; perborates; persulfates; and combinations thereof.

According to another aspect of the present invention, there is provided an aqueous composition for use in the removal of calcium oxalate scale, wherein said composition comprises:

nitric acid in an amount ranging from 2 to 10 wt % of the total weight of the composition;

sulfuric acid in an amount ranging from 0.5 to 10 wt % of the total weight of the composition; more preferably, in an amount ranging from 0.5 to 8.5 wt % of the total weight of the composition; even more preferably, in an amount ranging from 2 to 8.5 wt % of the total weight of the composition;

a compound comprising an amine moiety selected from the group consisting of: monoethanolamine; diethanolamine; and triethanolamine, in an amount ranging from 0.2 to 10 wt % of the total weight of the composition; more preferably, in an amount ranging from 0.2 to 5 wt % of the total weight of the composition;

a compound comprising a sulfonic acid moiety selected from the group consisting of: methanesulfonic acid; and ethanesulfonic acid, in an amount ranging from 0.2 to 20 wt % of the total weight of the composition; and a peroxide in an amount ranging from 0.5 to 20 wt % of the total weight of the composition.

Preferably, the composition for use in the removal of calcium oxalate scale, wherein said composition comprises:

nitric acid;

sulfuric acid;

said compound comprising an amine moiety selected from the group consisting of: monoethanolamine; diethanolamine; and triethanolamine;

said compound comprising a sulfonic acid moiety selected from the group consisting of: methanesulfonic acid; and ethanesulfonic acid; and wherein the total molar ratio of peroxide to nitric acid, sulfuric acid and to said compound comprising a sulfonic acid moiety ranges from 1:5 to 5:1.

Preferably, the total molar ratio of peroxide to nitric acid, sulfuric acid and sulfonic acid moiety ranges from 1:3 to 3:1.

More preferably, the total molar ratio of peroxide to nitric acid, sulfuric acid and sulfonic acid moiety ranges from 1:1 to 2:1.

According to a preferred embodiment of the present invention, said compound comprising an amine moiety selected from the group consisting of: monoethanolamine; diethanolamine; and triethanolamine.

According to a preferred embodiment of the present invention, said compound comprising a sulfonic acid moiety selected from the group consisting of: methanesulfonic acid; and ethanesulfonic acid.

According to a preferred embodiment of the present invention, the peroxide is hydrogen peroxide.

According to another aspect of the present invention, there is provided a peroxide-containing composition having a pH of at least 1 and a peroxide content of at least 75% of the initial peroxide concentration after 45 days, said composition comprising: nitric acid; sulfuric acid; a compound comprising an amine moiety selected from the group consisting of: monoethanolamine; diethanolamine; and triethanolamine; a compound comprising a sulfonic acid moiety selected from the group consisting of: methanesulfonic acid; and ethanesulfonic acid; a source of peroxide; and water.

According to another aspect of the present invention, there is provided a peroxide-containing composition having a pH of at least 1 and a peroxide content of at least 95% after 14 days, said composition comprising: nitric acid; sulfuric acid; a compound comprising an amine moiety selected from the group consisting of: monoethanolamine; diethanolamine; and triethanolamine; a compound comprising a sulfonic acid moiety selected from the group consisting of: methanesulfonic acid; and ethanesulfonic acid; a source of peroxide; and water.

According to another aspect of the present invention, there is provided a peroxide-containing composition having a pH of at least 1 and a peroxide content of at least 90% after 20 days, said composition comprising: nitric acid; sulfuric acid; a compound comprising an amine moiety selected from the group consisting of: monoethanolamine; diethanolamine; and triethanolamine; a compound comprising a sulfonic acid moiety selected from the group consisting of: methanesulfonic acid; and ethanesulfonic acid; a source of peroxide; and water.

According to another aspect of the present invention, there is provided a method of removing calcium oxalate scale from a surface contaminated therewith, said method comprising:

providing a surface contaminated with calcium oxalate scale;

exposing said surface contaminated with calcium oxalate scale to a composition comprising:

nitric acid;

sulfuric acid;

a compound comprising an amine moiety selected from the group consisting of: monoethanolamine; diethanolamine; and triethanolamine; a compound comprising a sulfonic acid moiety selected from the group consisting of: methanesulfonic acid; and ethanesulfonic acid; and a peroxide;

for a period of time sufficient to remove a pre-determined amount of said scale.

It is to be understood that the invention is not limited to the embodiments disclosed which are illustratively offered and that modifications may be made without departing from the invention.

The invention claimed is:

1. A modified aqueous acid composition consisting of:

nitric acid;

sulfuric acid;

a compound having an amine moiety and a sulfonic acid moiety;

a peroxide; and water.

2. The modified aqueous acid composition according to claim 1, wherein the peroxide and said compound having an amine moiety and a sulfonic acid moiety are present in a molar ratio of no more than 5:1 and no less than 1:3.

3. The composition according to claim 1, wherein said compound having an amine moiety and a sulfonic acid moiety is selected from the group consisting of: taurine and taurine derivatives.

4. The composition according to claim 1, wherein said compound having an amine moiety and a sulfonic acid moiety is a taurine derivative and is selected from the group consisting of: taurolidine; taurocholic acid; tauroselcholic acid; tauromustine; 5-taurinomethyluridine and 5-taurinomethyl-2-thiouridine; homotaurine; acamprosate; and taurates.

5. The composition according to claim 1, wherein said compound having an amine moiety and a sulfonic acid moiety is taurine.

6. The composition according to claim 1, wherein the peroxide is selected from the group consisting of: hydrogen peroxide; benzoyl peroxide; percarbonates; perborates; persulfates; and combinations thereof.

7. An aqueous composition for use in the removal of calcium oxalate scale, wherein said composition consists of:

nitric acid in an amount ranging from 2 to 10 wt % of the total weight of the composition;

sulfuric acid in an amount ranging from 0.5 to 10 wt % of the total weight of the composition;

a compound having an amine moiety and a sulfonic acid moiety selected from the group consisting of: taurine and taurine derivatives in an amount ranging from 0.2 to 10 wt % of the total weight of the composition;

a peroxide in an amount ranging from 0.5 to 20 wt % of the total weight of the composition; and water.

8. The composition according to claim 7 for use in the removal of calcium oxalate scale, wherein the total molar ratio of peroxide to nitric acid, sulfuric acid and sulfonic acid moiety ranges from 1:5 to 5:1.

9. The composition according to claim 7, wherein the total molar ratio of peroxide to nitric acid, sulfuric acid and sulfonic acid moiety ranges from 1:3 to 3:1.

10. The composition according to claim 7, wherein the total molar ratio of peroxide to nitric acid, sulfuric acid and sulfonic acid moiety ranges from 1:1 to 2:1.

11. The composition according to claim 7, wherein said compound having an amine moiety and a sulfonic acid moiety is a taurine derivative and is selected from the group consisting of: taurolidine; taurocholic acid; tauroselcholic acid; tauromustine; 5-taurinomethyluridine and 5-taurinomethyl-2-thiouridine; homotaurine; acamprosate; and taurates.

12. The composition according to claim 7, wherein said compound having an amine moiety and a sulfonic acid moiety is taurine.

13. The composition according to claim 7, wherein the peroxide is hydrogen peroxide.

14. A peroxide-containing composition consisting of:

nitric acid;

sulfuric acid;

a compound having an amine moiety and a sulfonic acid moiety selected from the group consisting of: taurine and derivatives thereof;

a source of peroxide;

water; and wherein said peroxide-containing composition has a pH of at least 1 and a peroxide content of at least 75% of the initial peroxide concentration after 45 days.

15. The peroxide-containing composition according to claim 14, wherein said composition has a pH of at least 1 and a peroxide content of at least 95% after 14 days.

16. The peroxide-containing composition according to claim 14, wherein said composition has a pH of at least 1 and a peroxide content of at least 90% after 20 days.

* * * * *